United States Patent [19]

Dewhurst et al.

[11] Patent Number: 4,897,428

[45] Date of Patent: Jan. 30, 1990

[54] INTERNAL MOLD RELEASE AGENT FOR USE IN MOLDING POLYURETHANES AND/OR POLYUREAS

[75] Inventors: John E. Dewhurst, Macungie; Gregory D. Williams, Pittsburgh; Robert M. Loring, Library, all of Pa.

[73] Assignee: Mobay Corporation, Pittsburgh, Pa.

[21] Appl. No.: 239,366

[22] Filed: Aug. 31, 1988

[51] Int. Cl.$^4$ .................... B29C 33/60; B29C 45/00; C08G 18/14
[52] U.S. Cl. ................................. 521/115; 106/38.22; 252/182.21; 252/182.26; 264/300; 264/328.6; 264/331.19; 521/124; 524/724; 524/762; 524/783
[58] Field of Search ...................... 264/300, 54, 328.6, 264/331.19; 106/38.22; 252/182.21, 182.26; 521/115, 124; 524/724, 762, 783

[56] References Cited

U.S. PATENT DOCUMENTS

| 4,218,543 | 8/1980 | Weber et al. | 521/51 |
| 4,519,965 | 5/1985 | Taylor et al. | 264/51 |
| 4,581,386 | 4/1986 | Taylor et al. | 521/125 |
| 4,585,803 | 4/1986 | Nelson et al. | 521/105 |

FOREIGN PATENT DOCUMENTS 2101140  1/1983  United Kingdom .

OTHER PUBLICATIONS

PCT International Application (WO 84/03288) (Dow Chemical) Aug. 30, 1984, 64 pp.

Primary Examiner—Jeffery Thurlow
Assistant Examiner—Leo B. Tentoni
Attorney, Agent, or Firm—Joseph C. Gil

[57] ABSTRACT

The present invention is directed to an internal mold release agent, a composition containing the mold release agent, and a method of using such agent. The mold release broadly comprises zinc oleate or zinc laurate and a specific fatty amine derivative.

3 Claims, No Drawings

INTERNAL MOLD RELEASE AGENT FOR USE IN MOLDING POLYURETHANES AND/OR POLYUREAS

BACKGROUND OF THE INVENTION

Reaction injection molding (RIM) has become an important process for the production of external automotive body parts and other types of molded products. The RIM process involves the intimate mixing of a polyisocyanate component and an isocyanate-reactive component followed by the injection of this mixture into a mold for subsequent rapid curing. The polyisocyanate component is typically based on a liquid polyisocyanate. The isocyanate-reactive component contains a high molecular weight isocyanate-reactive component, typically a polyol and/or an amine polyether, and usually contains a chain extender containing amino and/or hydroxyl groups. U.S. Pat. No. 4,218,543 describes a RIM process currently being commercially used on a large scale.

While products produced by the RIM process have excellent physical properties, the use of the RIM process was previously limited by the necessity of using sprayed external mold release agents (e.g., waxes, soaps, and the like). These agents had to be sprayed onto the mold surface before each shot or every several shots. Recently, internal mold release agents have become available which obviate the need for external release agents. Specifically internal mold release agents containing zinc carboxylates where the carboxylate group contains from 8 to 24 carbon atoms has met with widespread commercial use. Release agents of this type are described in U.S. Pat. Nos. 4,519,965, 4,581,386 and 4,585,803; and British Pat. No. 2,101,140. In using such zinc carboxylates it is necessary to mix the carboxylate with a compatibilizer which will solubilize the zinc carboxylate so that when the resultant mixture is mixed with the isocyanate-reactive components, the zinc carboxylate will possess improved resistance to precipitation. British Pat. No. 2,101,140 describes the mixture of a zinc stearate and an epoxidized vegetable oil (such as epoxidized soybean oil).

U.S. Pat. Nos. 4,519,965 and 4,581,386 describe the use of compatibilizer selected from the group consisting of nitrogen-containing, isocyanate-reactive acrylic compounds and nitrogen-containing, isocyanate-reactive polymers. Preferred compatibilizers include polyether polyamines and amine- or hydroxy-terminated, amine-initiated polyethers. U.S. Pat. No. 4,585,803 describes the use of compatibilizers which are tertiary amine compounds which contain at least one tertiary nitrogen. The tertiary amine compounds described advantageously contain one or more hydroxy groups. Although the combination of the zinc carboxylates and the compatibilizer noted have met with substantial commercial success, the search continues for other satisfactory compatibilizers.

DESCRIPTION OF THE INVENTION

The present invention is directed to a novel internal mold release agent for use in a molding process, to an isocyanate-reactive component containing the mold release agent, and to the use of the mold release agent in a molding process.

The internal mold release agent of the present invention comprises:

(a) either zinc oleate or zinc laurate, and
(b) a compatibilizer comprising a fatty amine derivative of the formula:

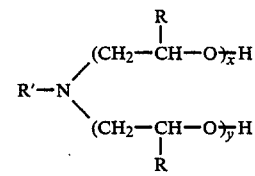

where
R represents hydrogen or methyl,
R' represents a $C_8$ to $C_{20}$ straight or branched, saturated or unsaturated, aliphatic group or the group

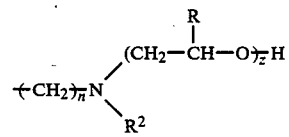

where $R^2$ represents a $C_8$ to $C_{20}$ straight or branched, saturated or unsaturated, aliphatic group, and n is an integer of from 1 to 4, x, y and z are each numbers between 1 and 49 and $x+y+z$ is from 3 to 50, in an amount sufficient to solubilize the particular zinc carboxylate used.

Suitable zinc carboxylates which may be used in the internal release agent mixture of the present invention are zinc oleate and zinc laurate.

The zinc carboxylates are used in amounts of about 0.5 to 10%, preferably about 1 to 6% and most preferably about 1 to 4% by weight, based on the weight of the isocyanate-reactive components.

Suitable compatibilizers are those of he type noted which assist in compatibilizing or solubilizing the zinc carboxylates without substantially affecting the processing characteristics of the molding reaction mixture or the physical properties or paintability of the resultant molded articles. More particularly, the compatibilizers of the present invention comprise a fatty amine derivative of the formula

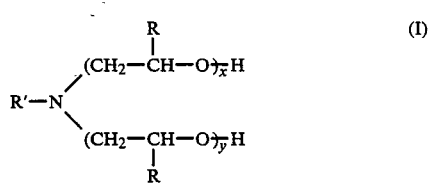

where
R represents hydrogen or methyl,
R' represents either a $C_8$ to $C_{20}$ straight or branched, saturated or unsaturated, aliphatic group, preferably a $C_{12}$ to $C_{18}$ aliphatic group, or the group

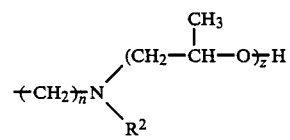

where $R^2$ represents a $C_8$ to $C_{20}$ straight or branched, saturated or unsaturated, aliphatic group, preferably a $C_{12}$ to $C_{18}$ aliphatic group, and n is an integer of from 1 to 4, and is preferably 3, and x, y and z are each numbers between 1 and 49, and x+y+z is from 3 to 50.

The fatty amine derivatives of the present invention are generally available commercially, and are produced by propoxylating or ethoxyl fatty amines. Suitable amines available from Akzo Chemie America include Propomeen C/12, a derivative according to formula I where R represents methyl, x and y are each 1, and R' is derived from cocoamine, and having a molecular weight of 320; Propomeen T/12, a derivative according to formula I where R represents methyl, x and y are each 1, R' is derived from tallow amine, and having a molecular weight of 382; Propomeen HT/12 is similar to Propomeen T/12, but is based on hydrogenated tallow amine and has a molecular weight of 384: Propodomeen T/13, a derivative according to formula I when R represents methyl, R' represents the group

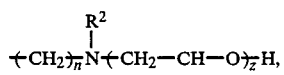

where $R^2$ is derived from tallow amine, n is 3, x, y and z are each 1, and having a molecular weight of 440; Ethomeen 18/12, a derivative according to formula I having a molecular weight of 357, where R represents hydrogen, x and y are each 1, and R' is an octadecyl group: Ethomeen S/12, a derivative according to formula I having a molecular weight of 352, where R represents hydrogen, x and y are each 1, and R' is derived from soyaamine; Ethomeen S/15, a derivative according to formula I having a molecular weight of 484, where R represents hydrogen, $x+y=5$, and R' is derived from soyaamine: the Ethodomeen family of products, which are derivatives according to formula I, having molecular weights of from 470 to 1000, where R represents hydrogen, x+y+z are from 3 to 15, n=3, and R' is derived from tallow amine.

The mold release compositions of the present invention are suitable for use with either flexible or rigid, optionally cellular, polyurethane or polyurea elastomers. The molded articles may possess various combinations of these properties such as rigid, non-cellular elastomers or flexible, cellular products for use, e.g., as shoe soles. "Polyurethanes" as defined throughout this application are polyaddition products wherein urethane groups and optionally urea groups are formed during the molding process according to the invention. "Polyureas" are defined as polyaddition products wherein only urea groups are formed during the RIM process according to the invention.

The present invention is also directed to an isocyanate-reactive mixture comprising (i) a high molecular weight polymer having at least two isocyanate-reactive groups and having a molecular weight of from 400 to about 10,000, (ii) from about 5 to 50% by weight, based on the weight of component (i) of a chain-extender having at least two isocyanate-reactive groups and (iii) an internal mold release agent mixture comprising:

(a) from about 0.05 to about 10% by weight, based on the weight of components (i) and (ii) of a zinc carboxylate selected from the group consisting of zinc oleate and zinc laurate, and (b) a compatibilizer comprising a fatty amine derivative of the formula:

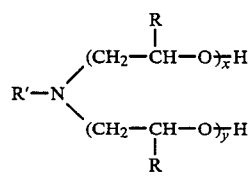

where
R represents hydrogen or methyl,

R' represents a $C_8$ to $C_{20}$ straight or branched, saturated or unsaturated, aliphatic group or the group

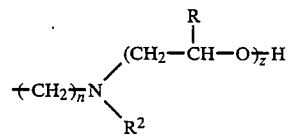

where $R^2$ represents a $C_8$ to $C_{20}$ straight or branched, saturated or unsaturated, aliphatic group, and n is an integer of from 1 to 4, x, y and z are each numbers between 1 and 49 and x+y+z is from 3 to 50, in an amount sufficient to solubilize the zinc carboxylate so that when component (iii) is in admixture with components (i) and (ii), the zinc carboxylate possesses improved resistance to precipitation. Finally the present invention is directed to a process for the production of optionally cellular parts by reacting a reaction mixture comprising the isocyanate-reactive component which contains the internal mold release with a polyisocyanate. The reaction mixture is preferably processed by the RIM process at an isocyanate index of from 70 to 130.

Suitable polyisocyanates for use in the present invention are aliphatic, cycloaliphatic, araliphatic, aromatic and heterocyclic polyisocyanates which are known and described for example by W. Siefken in Justus Liebigs Annalen der Chemie, 562, pages 75–136. Specific examples include ethylene diisocyanate, 1,4-tetramethylene diisocyanate, 1,6-hexamethylene diisocyanate, 1,12-dodecane diisocyanate, cyclobutane1,3-diisocyanate, cyclohexane-1,3- and -1,4-diisocyanate and mixtures thereof, 1-isocyanato-3,3,5-trimethyl-5-isocyanatomethyl-cyclo-hexane (isophorone diisocyanate or IPDI), 2,4- and 2,6-hexahydrotoluylene diisocyanate and mixtures thereof, hexahydro-1,3- and/or -1,4-phenylene diisocyanate, perhydro-2,4,- and/or -4,4'-diphenyl methane diisocyanate, 1,3- and 1,4-phenylene diisocyanate, 2,4- and 2,6-toluylene diisocyanate and mixtures thereof, diphenyl methane 2,4'- and/or 4,4'-diisocyanate, naphthylene 1,5-diisocyanate, triphenyl methane-4,4',4''-triisocyanate and polyphenyl polymethylene polyisocyanates of the type obtained by condensing aniline with formaldehyde, followed by condensation.

It is preferred to use the readily available polyisocyanates such as 2,4- and 2,6-toluene diisocyanate and mixtures of these isomers, polyphenyl polymethylene polyisocyanates of the type obtained by condensing aniline with formaldehyde, followed by phosgenation, and polyisocyanates containing carbodiimide groups, urethane groups, allophanate groups, isocyanurate groups, urea groups or biuret groups. Particularly preferred are the liquid derivatives of 4,4'-diphenyl methane diisocyanate (MDI) which may be liquefied inter alia by introducing carbodiimide groups, blending with 2,4'-diphenyl methane diisocyanate or by introducing urethane groups. Especially preferred are the liquefied derivatives of MDI prepared by reacting MDI with 0.1 to 0.3 mols of a polypropylene glycol having a molecular weight of up to about 700, in particular, dipropylene glycol, tripropylene glycol or mixtures thereof as disclosed, for example, in U.S. Pat. No. 3,644,457.

Also suitable for use as the polyisocyanate component are isocyanate-terminated prepolymers based on the above-mentioned polyisocyanates and the isocyanate-reactive compounds, preferably hydroxyl compounds, disclosed hereinafter for use in accordance with the present invention. Prepolymers of this type are disclosed in U.S. Pat. No. 4,374,210. The prepolymers are preferably based on the polyether or polyester polyols disclosed hereinafter and, optionally, the low molecular weight, hydroxyl group-containing chain extenders which are also disclosed hereinafter. Blends of any of the previously disclosed polyisocyanates may also be used in accordance with the present invention.

Other suitable reactants for preparing the products of the present invention include compounds containing at least two isocyanate-reactive groups. These compounds may be divided into two groups, high molecular weight compounds having a molecular weight of 400 to about 10,000 and low molecular weight compounds, i.e. chain extenders, having a molecular weight of 62 to 399. Examples of suitable high molecular weight compounds include the polyesters, polyethers polythioethers, polyacetals and polycarbonates containing at least 2, preferably 2 to 8 and most preferably 2 to 4 isocyanate-reactive groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of BF3 or by chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351 3,304,273: 3,523,093: and 3,110,695: and German Pat. No. 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g. reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above identified U.S. patents. Finally, representatives of the many and varied compounds which may be used in accordance with the invention may be found for example in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

Suitable aminopolyethers which may be used in accordance with the present invention as high molecular weight compounds (the molecular weight is always the average molecular weight which may be calculated from the functionality and the content of isocyanate-reactive groups) are those wherein at least about 30 and preferably about 60 to 100 equivalent % of the isocyanate-reactive groups are primary and/or secondary (preferably primary) aromatically or aliphatically (preferably aromatically) bound amino groups and the remainder are primary and/or secondary aliphatically bound hydroxyl groups.

In these compounds, the terminal residues carrying the amino groups may also be attached to the polyether chain by urethane or ester groups. These "aminopolyethers" are prepared by methods known per se. For example, polyhydroxypolyethers such as polypropylene glycol ethers may be aminated by reaction with ammonia in the presence of Raney nickel and hydrogen (BE-PS 634,741). U.S. Pat. No. 3,654,370 describes the production of polyoxyalkylene polyamines by reaction of the corresponding polyol with ammonia and hydrogen in the presence of a nickel, copper, chromium catalyst. DE-PS No. 1,193,671 describes the production of polyethers containing terminal amino groups by hydrogenation of cyanoethylated polyoxypropylene ethers. Other methods for the production of polyoxyalkylene (polyether) amines are described in U.S. Pat. Nos. 3,155,728, 3,236,895 and FR-PS No. 1,551,605. The production of polyethers containing terminal secondary amino groups is described, for example, in FR-PS No. 1,466,708.

Polyhydroxypolyethers of relatively high molecular weight may be converted into the corresponding anthranilic acid esters by reaction with isatoic acid anhydride, as described, for example, in DE-OS Nos. 2,019,432 and 2,619,840 and in U.S. Pat. Nos. 3,808,250, 3,975,428 and 4,016,143. Polyethers containing terminal aromatic amino groups are formed in this way.

According to DE-OS No. 2,546,536 and U.S. Pat. No. 3,865,791, relatively high molecular weight compounds containing terminal amino groups are obtained by reaction of NCO prepolymers based on polyhydroxypolyethers with enamines, aldimines or ketimines containing hydroxyl groups and subsequent hydrolysis.

It is preferred to use amino polyethers obtained by hydrolysis of compounds containing terminal isocyanate groups, for example in accordance with DE-OS No. 2,948,419 or U.S. Pat. No. 4,515,923, herein incorporated by reference in its entirety. In this process, polyethers most preferably containing 2 to 4 hydroxyl groups are reacted with polyisocyanates to form NCO prepolymers and, in a second step, the isocyanate groups are converted by hydrolysis into amino groups.

The "aminopolyethers" used in accordance with the invention are often mixtures of the compounds mentioned by way of example and (on a statistical average) most preferably contain 2 to 4 terminal isocyanate-reactive groups. In the process according to the invention, the "aminopolyethers" may be used in admixture with polyhydroxypolyethers free from amino groups.

In accordance with the present invention, the high molecular weight compounds are used in admixture with up to about 95% by weight, preferably up to about 50% by weight, more preferably about 8 to 30% by weight and most preferably about 12 to 26% by weight, based on the total quantity of the high molecular weight compounds, of the low molecular weight chain extenders. Examples of suitable hydroxyl group-containing chain extenders include ethylene glycol, 1,2- and 1,3-propane diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol and trimethylol propane.

Other suitable chain extenders include aromatic polyamines, preferably diamines, having molecular weights of less than 400, especially the stearically hindered aromatic polyamines, preferably diamines, having molecular weights of less than 400, especially the stearically hindered aromatic diamines which contain at least one linear or branched alkyl substituent in the ortho-position to the first amino group and at least one, preferably two linear or branched alkyl substituents containing from 1 to 4, preferably 1 to 3, carbon atoms in the ortho-position to a second amino group. These aromatic diamines include 1-methyl-3,5-diethyl-2,4-diamino benzene, 1-methyl-3,5-diethyl-2,6-diamino benzene, 1,3,5-trimethyl-2,4-diamino benzene, 1,3,5-triethyl-2,4-diamino benzene, 3,5,3',5'-tetraethyl-4,4'-diamino diphenylmethane, 3,5,3',5'-tetra-isopropyl-4,4'-diamino diphenylmethane, 3,5-diethyl3',5'-diisopropyl-4,4'-diamino diphenylmethane, 3,5-diethyl-5,5'-diisopropyl-4,4'-diamino diphenylmethane, 1-methyl-2,6-diamino-3-isopropylbenzene and mixtures of the above diamines. Most preferred are mixtures of 1-methyl-3,5-diethyl-2,4-diamino benzene and 1-methyl-3,5-diethyl-2,6-diamino benzene in a weight ratio between about 50:50 to 85:15, preferably about 65:35 to 80:20.

In addition, aromatic polyamines may be used in admixture with the stearically hindered chain extenders and include, for example, 2,4- and 2,6-diamino toluene, 2,4'- and/or 4,4'-diamino-diphenylmethane, 1,2- and 1,4-phenylene diamine, naphthalene-1,5-diamine and triphenylmethane-4,4',4"-triamine. The difunctional and polyfunctional aromatic amine compounds may also exclusively or partly contain secondary amino groups such as 4,4'-di-(methylamino)-diphenylmethane or 1-methyl-2-methylamino-4-amino-benzene. Liquid mixtures of polyphenyl polymethylene-polyamines, of the type obtained by condensing aniline with formaldehyde, are also suitable. Generally, the nonstearically hindered aromatic diamines and polyamines are too reactive to provide sufficient processing time in a RIM system. Accordingly, these diamines and polyamines should generally be used in combination with one or more of the previously mentioned stearically hindered diamines or hydroxyl group-containing chain extenders.

Other additives which may be used in the present invention include catalysts, especially tin(II) salts of carboxylic acids, dialkyl tin salts of carboxylic acids, dialkyl tin mercaptides, dialkyl tin dithioesters and tertiary amines. Preferred among these catalysts are dibutyl tin dilaurate and 1,4-diazabicyclo-(2,2,2)-octane (triethylene diamine), especially mixtures of these catalysts. The catalysts are generally used in amounts of about 0.01 to 10%, preferably about 0.05 to 2%, based on the weight of the high molecular weight component.

It is also possible to use surface-active additives such as emulsifiers and foam stabilizers. Examples include N-stearly-N',N'-bis-hydroxyethyl urea, oleyl polyoxyethylene amide, stearyl diethanolamide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565. In addition to the catalysts and surface-active agents, other additives which may be used in the molding compositions of the present invention include known blowing agents, cell regulators, flame retarding agents, plasticizers, dyes, fillers and reinforcing agents such as glass in the form of fibers or flakes or carbon fibers.

The compositions according to the present invention may be molded using conventional processing techniques and are especially suited for processing by the RIM process. In general, two separate streams are intimately mixed and subsequently injected into a suitable mold, although it is possible to use more than two streams. The first stream contains the polyisocyanate component, while the second stream contains the polyol component, chain extender, the internal mold release agent mixture and any other additive which is to be included.

The invention is further illustrated but is not intended to be limited by the following examples in which all parts and percentages are by weight unless otherwise specified.

EXAMPLES

EXAMPLE 1

400 parts of zinc laurate were dissolved in 800 parts of Propoduomeen T/13 with heating. The mixture was heated at a rate of 1° C. per minute until dissolution began. The mixture was then held at that temperature until dissolution was complete. Upon cooling to room temperature a liquid concentrate resulted, hereafter Release Agent A.

EXAMPLE 2

400 parts of zinc laurate were dissolved in 800 parts of Propoduomeen T/12 with heating using the techniques of Example 1. Upon cooling to room temperature a liquid concentrate resulted, hereafter Release Agent B.

EXAMPLES 3A and B

Molded products were made from the formulation set forth in Table 1. In Example 3A, the equipment used was a Desmo PSA 70 model while in Example 3B, an Admiral open pour equipped with a Plaztek mixhead was used. In both instances the following processing parameters were used:

| | |
|---|---|
| Isocyanate Index: | 96 to 101 |
| Demold Time: | 2 to 4 minutes |
| Mold Temp: | 100 to 120° F. |
| Material Temp: | 70 to 82° F. |

The following materials were used:
(i) Polyol A: a 4000 molecular weight propylene glycol/propylene oxide/ethylene oxide polyether having ethylene oxide termination and having an OH number of about 28.
(ii) Polyol B: a commercially available polyurea-filled polyether polyol available from Mobay Corporation sold as MULTRANOL 9151, having an OH number of about 28.
(iii) XB: 1,4-butanediol.
(iv) DABCOHB: a delayed action amino salt catalyst available from the Air Products Company.
(v) DBTDL: dibutyltin dilaurate.
(vi) L5810: a polydimethylsiloxane surfactant available from Union Carbide.
(vii) T20,000: Tegosioxin 20,000, a surfactant available from Goldschmidt;

The isocyanate used was a reaction product of tripropylene glycol and 4,4'-methylene bis(phenyl isocyanate) having an NCO content of about 23%.

The results were as indicated in Table 1.

TABLE 1

| Example | 3 A | 3 B |
|---|---|---|
| Polyol A | 71.4 | 71.4 |
| Polyol B | 14.1 | 14.1 |
| XB | 5.15 | 5.1 |
| DABCOHB | 2.15 | 2.1 |
| DBTDL | .03 | .03 |
| L5810 | .10 | .10 |
| T20,000 | .08 | .08 |
| Freon 11 | 6.5 | 6.5 |
| Water | .16 | .16 |
| Release Agent | | |
| A | 6.0 | |
| B | | 4.5 |
| No. of Releases | 22 | 15 |

EXAMPLE 4

Using the technique of Example 1, 2 parts of zinc oleate were dissolved with heating into 4 parts of Ethomeen O/12 to yield a clear liquid concentrate.

EXAMPLE 5

Using the technique of Example 1, 2 parts of zinc oleate were dissolved with heating into 4 parts of Ethomeen S/12 to yield a clear liquid concentrate.

EXAMPLE 6

Using the technique of Example 1, 2 parts of zinc laurate were dissolved with heating into 4 parts of Propomeen C/12 to yield a clear concentrate.

EXAMPLE 7

RIM plaques were prepared using a LK-06 laboratory RIM machine. A rectangular mold, 300 mm×200 mm×8 mm, was used to mold the samples under the following conditions:

| | |
|---|---|
| Component A Temperature | 32° C. |
| Component B Temperature | 40° C. |
| Isocyanate Index | 110 |
| A/B Weight Ratio | (125–140)/100 |
| Mold Temperature | 60° C. |
| Impingement Pressure | 2646 PSI |
| External Mold Release | CHEM-TREND MR-515 |
| Demolding Time | 2 minutes |
| Postcure Conditions | 120° C. for 1 hour |

The mold was sprayed once with the external release agent, followed by multiple releases due to the internal release agent. The samples were tested for density (ASTM D-792), flex modulus (ASTM D-790), elongation (ASTM D-638), heat sag (ASTM D-3769), tear strength-die "C" (ASTM D-614) and notched Izod (ASTM D-256).

The results and formulations (in parts by weight) were as set forth in Table 2.

In these examples, the following materials were used:
(a) POLYOL: an ethylene oxide-tipped-glycerine-initiated, propylene oxide/ethylene oxide polyether (weight ratio of propylene oxide polyether (weight ratio of propylene oxide to ethylene oxide of about 7:1), having an OH number of about 28.
(b) DETDA: an 80/20 mixture of 1-methyl-3,5-diethyl-2,4- and -2,6-diamino benzene.
(c) SOLUBILIZER A: an ethylene diamine/propylene oxide adduct having an OH number of about 630.
(d) SOLUBILIZER B: an amine terminated polyether having a molecular weight of about 400, containing three primary amino groups, and available from Texaco as Jeffamine T-403.
(e) DBTDL: dibutyltin dilaurate.
(f) TEDA: triethylenediamine.
(g) ISO: a tripropylene glycol/4,4"-methylene bis(-phenylisocyanate) adduct having an NCO content of about 23%.

As opposed to System A and System B, Propoduomeen T/13 (System C) gave the higher elongation, notched Izod impact and tear strength at equivalent flex modulus and heat sag.

TABLE 2

| | A | B | C |
|---|---|---|---|
| B-Side: | | | |
| Polyol | 74.8 | 74.8 | 74.8 |
| DETDA | 20 | 20 | 20 |
| Solubizer A | 3 | | |
| Solubizer B | | 3 | |
| Propoduomeen T/13 | | | 3 |
| Zinc laurate | 2 | 2 | 2 |
| DBTDL | 0.1 | 0.1 | 0.1 |
| TEDA | 0.1 | 0.1 | 0.1 |
| A-Side: | | | |
| ISO | 57.6 | 55.0 | 54.4 |

TABLE 2-continued

| | A | B | C |
|---|---|---|---|
| Results: | | | |
| Density | 65.8 | 65.7 | 65.8 |
| Flex | 63700 | 63500 | 64700 |
| Elongation | 115 | 167 | 182 |
| Izod | 6.05 | 8.62 | 10.7 |
| Tear Strength | 574 | 599 | 625 |
| 6" 250° F. | 14.7 | 16.7 | 14.7 |
| 4" 325° F. | 20.8 | 26.0 | 21.7 |
| Release | very good | very good | very good |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An internal mold release composition comprising
(a) a zinc carboxylate selected from the group consisting of zinc oleate and zinc laurate, and
(b) a compatibilizer comprising a fatty amine derivative of the formula:

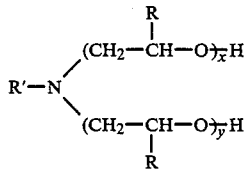

where
R represents hydrogen or methyl,
R' represents a $C_8$ to $C_{20}$ straight or branched, saturated or unsaturated, aliphatic group or the group

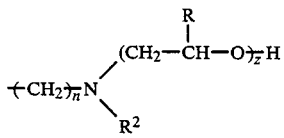

where $R^2$ represents a $C_8$ to $C_{20}$ straight or branched, saturated or unsaturated, aliphatic group, and n is an integer of from 1 to 4, x, y and z are each numbers between 1 and 49 and $x+y+z$ is from 3 to 50, in an amount sufficient to solubilize the zinc carboxylate.

2. An isocyanate-reactive composition comprising
(i) a high molecular weight polymer having at least two isocyanate-reactive groups and having a molecular weight of from 400 to about 10,000,
(ii) from about 5 to 50% by weight, based on the weight of component (i) of a chain-extender having at least two isocyanate-reactive groups and
(iii) an internal mold release agent mixture comprising:
(a) from about 0.05 to about 10% by weight, based on the weight of components (i) and (ii) of a zinc carboxylate selected from the group consisting of zinc oleate and zinc laurate, and
(b) a compatibilizer comprising a fatty amine derivative of the formula:

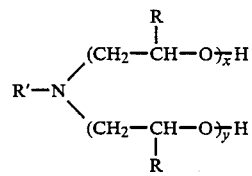

where
R represents hydrogen or methyl,
R' represents a $C_8$ to $C_{20}$ straight or branched, saturated or unsaturated, aliphatic group or the group

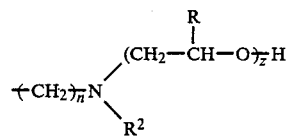

where $R^2$ represents a $C_8$ to $C_{20}$ straight or branched, saturated or unsaturated, aliphatic group, and n is an integer of from 1 to 4, x, y and z are each numbers between 1 and 49 and $x+y+z$ is from 3 to 50, in an amount sufficient to solubilize the zinc carboxylate so that when component (iii) is in admixture with components (i) and (ii), the zinc carboxylate possesses improved resistance to precipitation.

3. In a process for preparing a molded product by reacting an isocyanate with an isocyanate-reactive material in a mold, the improvement wherein the reaction mixture contains an internal mold release composition comprising
(a) a zinc carboxylate selected from the group consisting of zinc oleate and zinc laurate, and
(b) a compatibilizer comprising a fatty amine derivative of the formula:

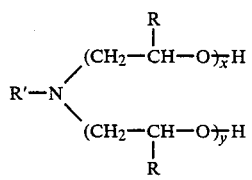

where
R represents hydrogen or methyl,
R' represents a $C_8$ to $C_{20}$ straight or branched, saturated or unsaturated, aliphatic group or the group

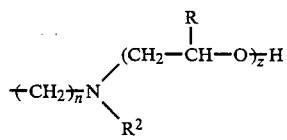

where $R^2$ represents a $C_8$ to $C_{20}$ straight or branched, saturated or unsaturated, aliphatic group, and n is an integer of from 1 to 4, x, y and z are each numbers between 1 and 49 and $x+y+z$ is from 3 to 50, in an amount sufficient to solubilize the zinc carboxylate.

* * * * *